(12) United States Patent
Brookes (10) Patent No.: US 6,853,332 B1
(45) Date of Patent: Feb. 8, 2005

(54) AUTOMATIC REGISTRATION OF IMAGES IN DIGITAL TERRAIN ELEVATION DATA

(75) Inventor: Tom M Brookes, Plymouth (GB)

(73) Assignee: Bae Systems PLC, London (GB)

( * ) Notice: Subject to any disclaimer, the term of this patent is extended or adjusted under 35 U.S.C. 154(b) by 81 days.

(21) Appl. No.: 10/137,489

(22) Filed: Apr. 24, 2002

(30) Foreign Application Priority Data

Jul. 19, 2001 (GB) .............................................. 0117541

(51) Int. Cl.$^7$ ............................................. G01S 13/89
(52) U.S. Cl. .................. 342/191; 342/25 R; 342/25 A; 342/190; 342/195; 342/63; 342/64; 342/357.01; 342/357.06; 382/209; 382/224; 382/228; 382/278
(58) Field of Search ................................ 701/200, 201, 701/206–212, 223; 342/25, 61–66, 175, 176, 179, 190, 191–197, 118, 120, 121, 122, 357.01–357.17, 25 R, 25 A, 25 B–25 F; 382/100, 113, 154, 190, 191, 192, 209–228, 276, 278, 279–281

(56) References Cited

U.S. PATENT DOCUMENTS

| 4,914,734 A | * | 4/1990 | Love et al. .................... 342/64 |
| 4,939,663 A | | 7/1990 | Baird |
| 5,018,218 A | * | 5/1991 | Peregrim et al. ............. 342/62 |
| 5,146,228 A | * | 9/1992 | Irani et al. ..................... 342/64 |
| 5,260,709 A | * | 11/1993 | Nowakowski ................ 342/62 |
| 5,272,639 A | * | 12/1993 | McGuffin ................... 701/207 |
| 5,311,195 A | * | 5/1994 | Mathis et al. ........... 342/357.14 |
| 5,335,181 A | * | 8/1994 | McGuffin ................... 701/200 |
| 5,341,142 A | * | 8/1994 | Reis et al. ..................... 342/64 |
| 5,430,445 A | * | 7/1995 | Peregrim et al. ............. 342/25 |
| 5,485,384 A | * | 1/1996 | Falconnet ................... 701/207 |
| 5,488,559 A | * | 1/1996 | Seymour ................... 701/208 |

FOREIGN PATENT DOCUMENTS

| EP | 0 785 414 A1 | 7/1997 |
| GB | 2 293 452 A | 3/1996 |

* cited by examiner

Primary Examiner—Bernarr E. Gregory
(74) Attorney, Agent, or Firm—Nixon & Vanderhye P.C.

(57) ABSTRACT

A method of registering reconnaissance image data with map data is disclosed, comprising recording image data at a plurality of positions, together with the role, pitch and height above mean sea level data from an airborne navigation system and imaging system, and recording altitude of a reconnaissance craft from an altimeter; obtaining a difference between said recorded altitude data, and an altitude calculated from said navigation system data and a map data; selecting a difference data having a lowest standard deviation, and at a position of said selected difference data generating a three dimensional surface data using a bi-quadratic equation; generating a bi-quadratic surface of each of a plurality of positions for which data is recorded; generating a difference data between said bi-quadratic surface data, and height data obtained from said map, and minimising an error between bi-quadratic surface data and said height data by translating said position data relative to said map data, until minimum error is achieved; registering said image data with said map data after applying a said translation of said image data.

9 Claims, 13 Drawing Sheets

[GPSposition 1] - [Image 1 frame data 1][height points + positions 1]

[GPSposition 2] - [Image 2 frame data 2][height points + positions 2]

[GPSposition 3] - [Image 3 frame data 3][height points + positions 3]

[GPS position N] - [Image frame data N][height points + positions N]

Map Data

AUTOMATIC REGISTRATION OF IMAGES IN DIGITAL TERRAIN ELEVATION DATA

FIELD OF THE INVENTION

The present invention relates to the field of processing of reconnaissance data.

BACKGROUND TO THE INVENTION

Currently, terrestrial reconnaissance data is collected as a set of image data, for example taken by digital camera mounted to an aircraft, and a set of three dimensional map data, for example ordinance survey map data.

Conventionally, the image data and digital map data are registered with each other to provide a composite data. Production of the composite data requires the identification of individual features which appear in both the image data and the digital map data. There are known feature extraction algorithms, which can identify roads or other features which appear in both sets of data. However, the final registration of the two sets of data together and confirmation that that registration is correct, remains a labour intensive manual task.

SUMMARY OF THE INVENTION

Specific implementations according to the present invention provide a novel system configuration of prior art equipment, combined with relatively simple additional novel components which allows automatic registration of image data of any type, with digital terrain elevation data.

The best mode described herein is based on data collection from an aircraft.

However, the invention can be implemented for operation of any other aerial or satellite data source, where on board data collection and measurement systems meet the requirements described herein.

Benefits of the implementations described herein include:

Reduction in registration errors between an image data and a digital terrain elevation data Reduction in labour required to register image data with digital terrain elevation data.

According to a first aspect of the present invention there is provided a method of matching reconnaissance image data with map data, said method comprising the steps:

recording a frame of said image data at each of a plurality of positions;

recording a position data at each of said positions;

recording an altitude above ground level data at each of said positions;

recording a height above mean sea level data at each of said positions;

for each said position, determining a first height above ground as a difference between said mean sea level, and a height data at said position read from said map data;

for each said position comparing said first height data with said altitude data to obtain a corresponding respective standard deviation of difference between said first and second heights;

selecting a position having a lowest standard deviation of a plurality of said standard deviations, and matching said image position to a corresponding position on said map for said position with said lowest standard deviation;

generating a surface data at said selected position;

comparing a height of said generated surface data with said map height data at said position, and obtaining a height error data between said generated surface height and said map height data; and translating said image data until said error data is optimised.

The invention includes a method for providing composite digital and terrain image map data, said method comprising the steps of:

(a) taking and recording a sequential series of terrain images from an airborne or above atmosphere vehicle having an internal navigation system, and an altimeter for taking and recording a sequential series of terrain images, navigation positions and altimeter readings;

(b) establishing and recording for each image the height of the vehicle above the terrain as indicated by the altimeter and the position, roll and pitch of the vehicle above the terrain as indicated by the navigation system;

(c) comparing the digital map terrain elevation data with the vehicle height data along the series of recorded terrain images; (d) establishing and orientating matrices about selected data points along the series of recorded terrain images where the difference between the digital map terrain elevation data and vehicle height data is within a desired limit;

(e) calculating the differences and differences squared between the vehicle height above sea level and the digital map terrain elevation at each selected data point;

(f) repeating steps (a) to (e) for a further sequential series of terrain images;

(g) calculating a matching matrix from the data of step (e) for both series of terrain images to establish a standard deviation at each data point;

(h) identifying the smallest standard deviation which, when the vehicle position from the vehicle internal navigation system is correct, provides the centre point or centre point of the matching matrix; and (i) estimating from the centre point, the difference between the digital map data and the vehicle navigation system data when the terrain images were taken from, from which the digital map and terrain images can be registered one with the other, to provide composite map data.

The invention includes a method of registering reconnaissance image data with map data comprising the steps of recording image data from a plurality of positions, together with the roll, pitch and height above mean sea level data from an airborne navigation system and imaging system at those positions;

recording an altitude data of said positions, using an altimeter;

obtaining a difference between said recorded altitude data, and an altitude calculated from said navigation system data and a map data;

selecting a difference data having a lowest standard deviation, and at a position of said selected difference data generating a three dimensional surface data;

generating a three dimensional surface data of each of said plurality of positions for which said image data is recorded;

generating a difference data between said three dimensional surface data, and height data obtained from said map, and minimising an error between said three dimensional surface data and said height data by translating said position data relative to said map data, until minimum error is achieved;

registering said image data with said map data after applying said translation of said image data.

According to a second aspect of the present invention there is provided a method of matching a set of a plurality of reconnaissance image data frames collected by a reconnaissance vehicle traversing over a terrain, with a map data, said method comprising the steps of:

recording said plurality of reconnaissance image data frames using an imaging system on board said reconnaissance vehicle, as said vehicle flies over said terrain;

for each said reconnaissance image data recorded, recording a vehicle latitude, longitude position data using a navigation system on board said vehicle;

for each said longitude, latitude position data, recording a height above mean sea level data using said on board navigation system;

for each said position data, recording a height of said vehicle above said terrain, using an on board vehicle height measurement system;

matching each of said reconnaissance vehicle latitude, longitude positions, with corresponding X, Y positions of said map data; and matching said image data with said map data.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

An overall process for registration of image data with digital terrain elevation data includes two stages as follows:

Firstly, airborne or above earth data collection by a reconnaissance vehicle in which image data and digital terrain elevation data is recorded; and secondly, registration of the collected image data and elevation data with a digital map data to precisely register the image data with the map data.

The second stage may be carried out off-line, outside the reconnaissance vehicle.

Figure 1:
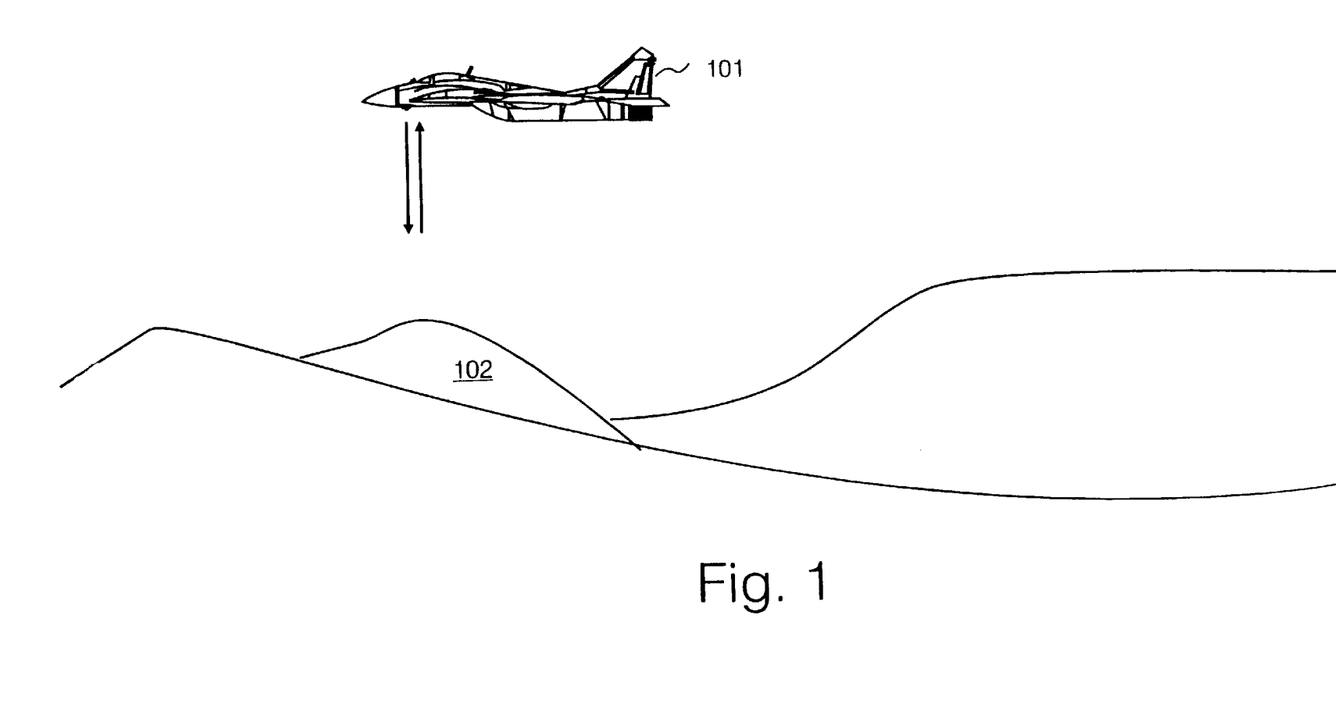
FIG. 1 illustrates schematically a reconnaissance vehicle on a reconnaissance mission for collection of image data and altitude data above the Earth's surface.

Referring to FIG. 1 herein, a reconnaissance vehicle 101 which may be an aircraft or a satellite is fitted with its own internal navigation system, for example a global positioning system (GPS) satellite navigation system, or a high quality Inertial Navigation System (INS) which enables the aircraft to record its precise latitude and longitude location to a resolution of approximately 100 meters or less at any time; an altimeter, for example a radio altimeter or a laser altimeter, which enables the vehicle to measure its vertical position relative to the earth's terrestrial surface 102 with a vertical resolution of better than approximately 1 meter, and an imaging system, which enables the vehicle to record digital images of the earth's surface at discrete positions of the vehicle.

Figure 2:
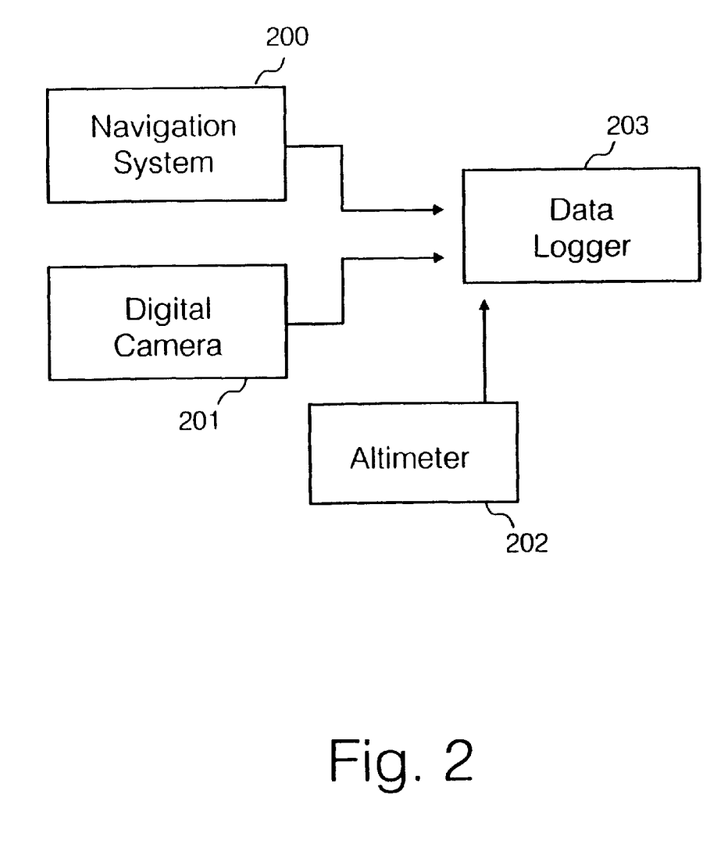
FIG. 2 illustrates schematically on board reconnaissance apparatus fitted to a reconnaissance vehicle according to a specific implementation of the present invention.

Referring to FIG. 2 herein, there is illustrated schematically on board equipment on reconnaissance vehicle 101. The on board equipment includes the vehicle's known navigation system 200 giving an accurate position to within around 100 meters in latitude (North-South) and longitude (East-West); a known digital camera 201 for collecting image data of the earth's surface; an altimeter 202 such as a radio altimeter or a laser altimeter, for measurement of vehicle height, accurate to within around 1 meter from the earth's surface, and a known data logger 203, the data logger arranged to record position data from the navigation system 200, and to record image data of terrain produced by digital camera 201.

Figure 3:
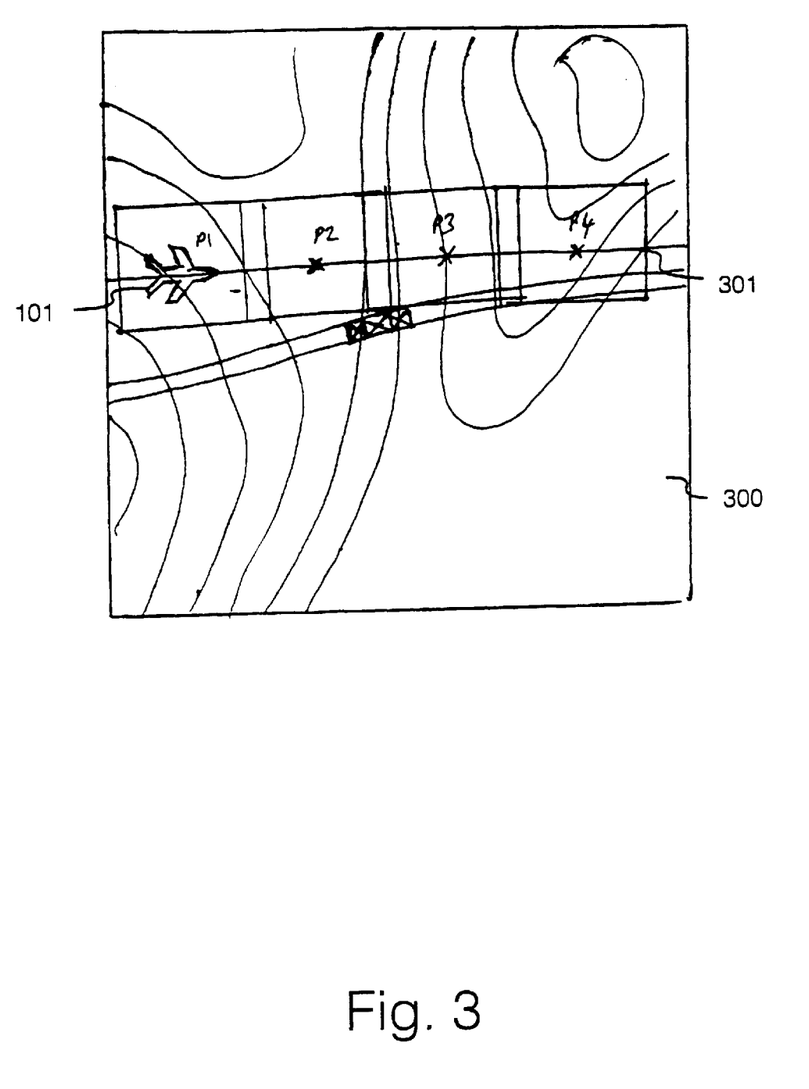
FIG. 3 illustrates schematically a path taken by the reconnaissance vehicle on a reconnaissance mission, above the Earth's surface.

Referring to FIG. 3 herein, there is illustrated schematically a portion of the earth's surface 300 in plan view showing image data taken by the vehicle as it flies over the earth's surface. The vehicle 101 records a sequence of height data points along its track, at the same time as image data is being taken. Image data is taken in data frames at discrete positions P1, P2, P3 of the vehicle. Each position is accurate to within around 100 meters in both the latitude (North-South) and longitude (East-West) directions. Each image frame is recorded as an image frame data in the data logger of the vehicle, along with the position information locating the position of the vehicle at the time when that image data was collected.

Along with the position data of the vehicle, are recorded its roll and pitch data from the vehicle's navigation system, when each image is taken.

After the vehicle has finished its data collection run across the Earth's surface, logged on the internal data recorder of the vehicle is an (image, position) tuple, and a sequence of height point data and position data. Both data sets use a common source for the vehicle position, thereby reducing error.

Figure 4:
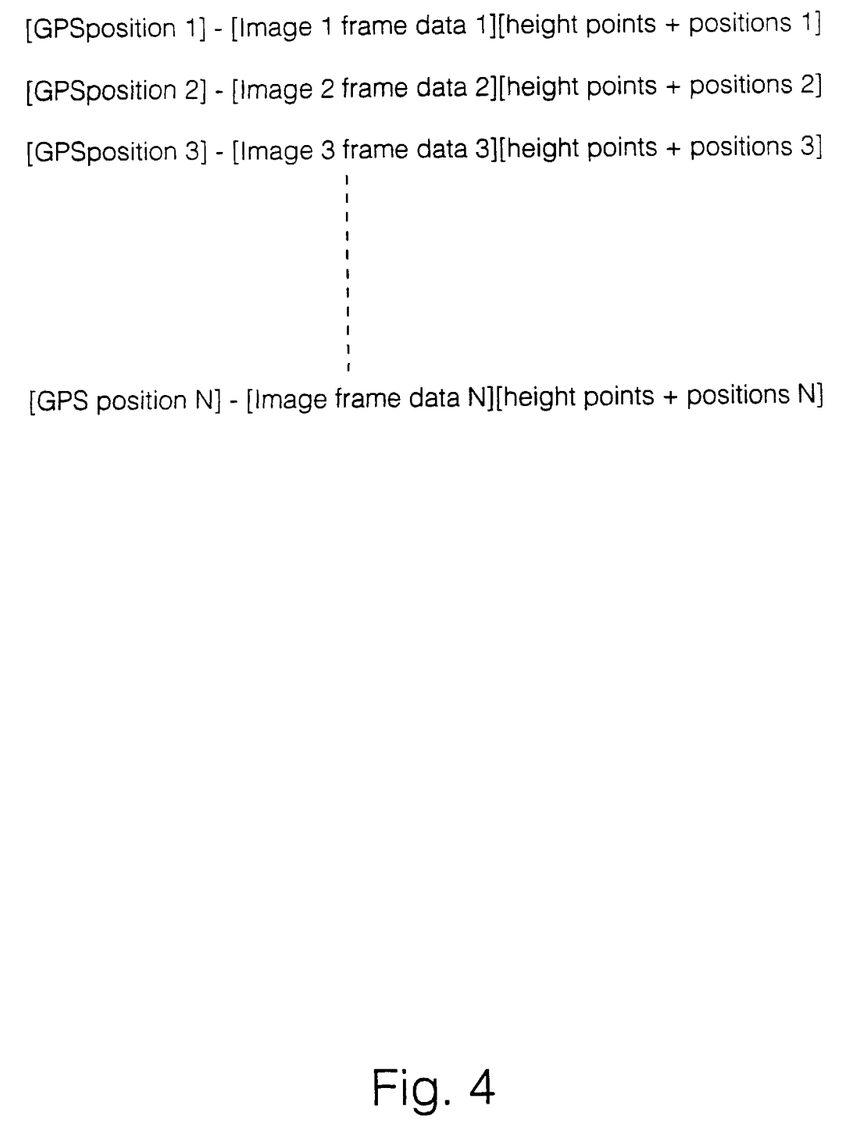
FIG. 4 illustrates schematically data collected by a data log apparatus of the reconnaissance vehicle, describing image data, altitude data and position data of the reconnaissance vehicle.

Referring to FIG. 4 herein, there is illustrated schematically data collected by data logger 203 as a result of a reconnaissance data collection mission carried out by the vehicle 101. The data comprises a set of data records, each data record comprising:

a GPS position data recording a, X, Y, latitude and longitude position of the vehicle;

a height point at the position, recording an altitude above sea level of the vehicle;

an image frame data of an image taken with the vehicle at the GPS position.

After a reconnaissance mission, data is removed from the data logger, and input into a data processing apparatus, where the image data is registered, that is matched up, with an existing map data.

Figure 5:
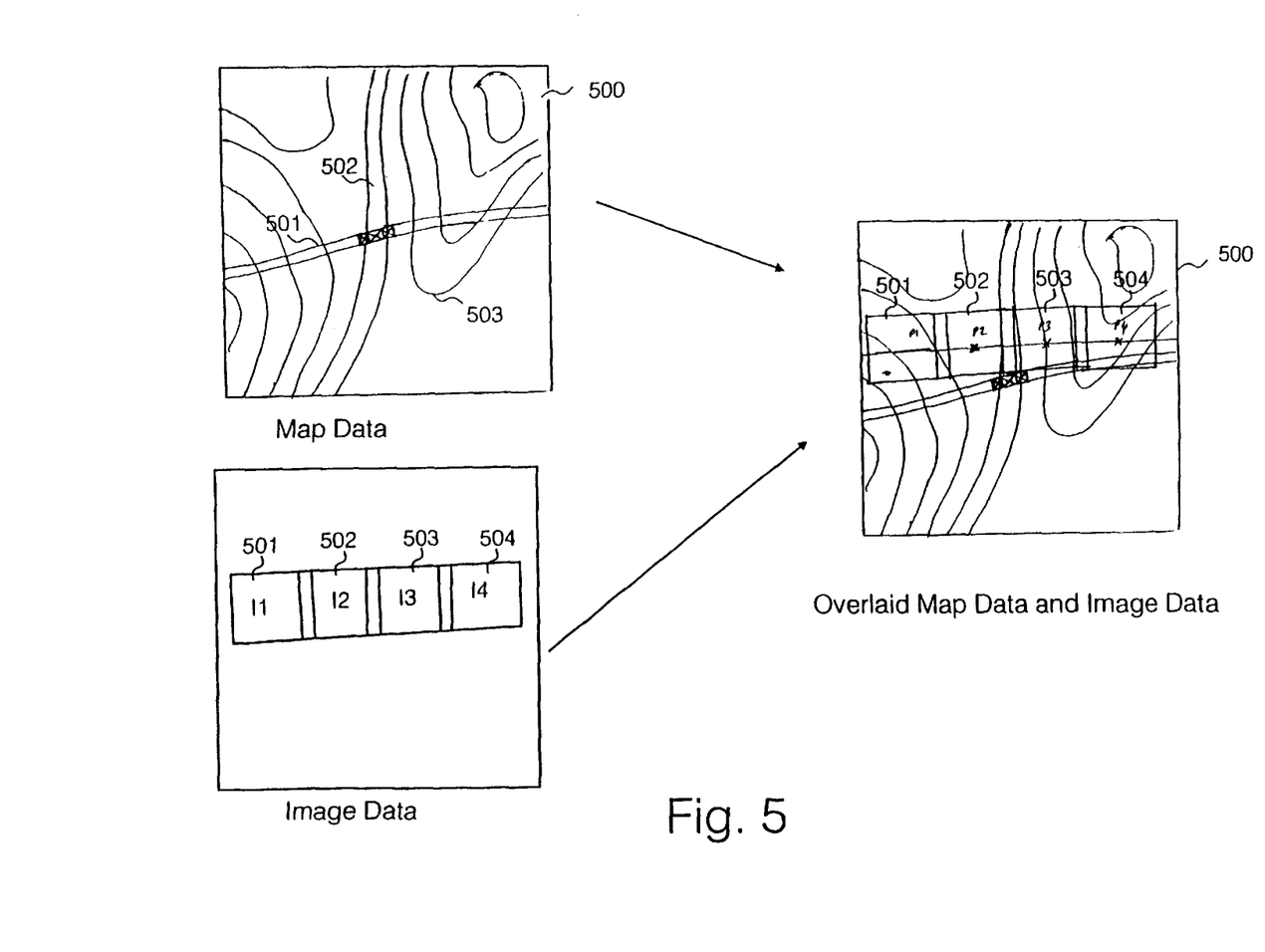
FIG. 5 illustrates schematically overlaying and registration of image data with map data according to specific method of the present invention.

Referring to FIGS. 5 and 6 herein, there are illustrated schematically data processing steps carried out on altitude and position data collected from the reconnaissance vehicle, in comparison with map data.

In FIG. 5 map data 500 comprises a matrix of relatively low resolution data, identifying features such as river 502, road 501, and bridges in two dimensional plan view, with height information, for example height contour data 503.

The image data comprises a plurality of successive data frames of relatively high resolution two dimensional image data I1 (504); I2 (505); I3 (506); I4 (507).

The image data and map data are overlaid with each other as illustrated in FIG. 5. An object of the specific methods disclosed herein is to match up the image data with the map data, accurately and in an automated manner.

Figure 6A:
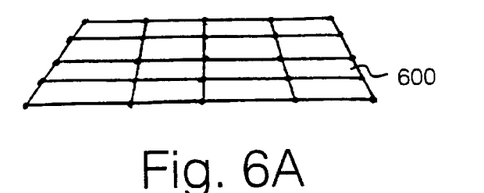
FIG. 6A illustrates schematically a two-dimensional x, y data plane representing mean sea level.

Referring to FIG. 6 herein, there is illustrated schematically types of raw input data which are available for processing:

Referring to FIG. 6A herein there is illustrated a notional two dimensional grid of X, Y coordinates, at mean sea level (MSL) to which the map data and data collected from the vehicle can be referenced.

Figure 6B:
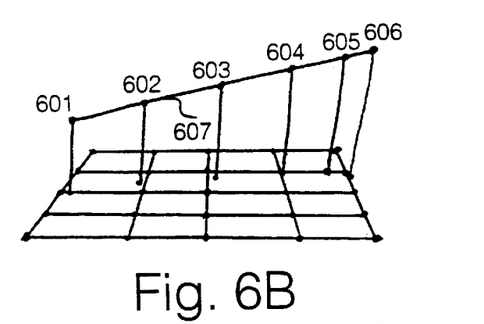
FIG. 6B illustrates schematically navigation position data points recorded at positions where image data frames are taken, recorded from an on board navigation system on the reconnaissance vehicle.

Referring to FIG. 6B herein there is illustrated schematically navigation data points 600–605 recorded by the vehicle, as it flies along a trajectory 607 over the Earth's surface. The navigation points recorded from the vehicle navigation system include latitude and longitude position, typically to a resolution of the nearest 100 meters in both latitude and longitude, corresponding to X and Y directions in FIG. 6A, and height above mean sea level, typically with a resolution of approximately 100 meters.

Figure 6C:
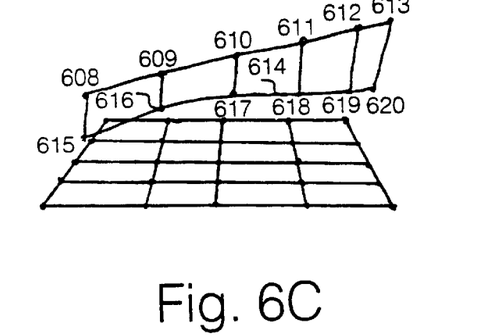
FIG. 6C illustrates schematically a set of radio altimeter readings above a terrestrial surface, taken at the position points of the vehicle as shown in FIG. 6B.

Referring to FIG. 6C herein, there is illustrated schematically a set of radio altimeter data points 608–613 recorded from the vehicle's on board radio or laser altimeter, recording a height above a terrain surface 614 immediately underneath the vehicle as it flies. Surface points 615–620 correspond to respective altimeter readings 608–613 in X, Y latitude and longitude position and are directly underneath the vehicle at the positions where the vehicle records images of the earth's surface. The altimeter data points 608–613 have a resolution of approximately 1 meter, measured from the terrestrial surface points 615–620.

Therefore, the set of vehicle trajectory points 601–606 have a resolution of approximately 100 meters above mean sea level (the X Y plane in FIG. 6B), whereas the recorded altimeter data points at the same XY latitude, longitude coordinates 608–613 have a resolution of approximately 1 meter, and are measured directly from the terrestrial surface points 615–620 at the same XY latitude/longitude coordinate positions.

Figure 6D:
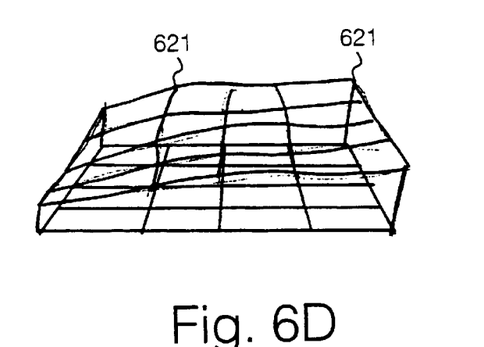
FIG. 6D illustrates schematically a 3-dimensional map data comprising a plurality of x, y latitude and longitude co-ordinates, together with digital terrain elevation data points on a terrestrial surface.

Referring to FIG. 6D herein, there is illustrated schematically a map data, comprising a plurality of X, Y latitude, longitude coordinates, together with a set of height above mean sea level (HMSL) height data points 621.

The map data contains features such as roads, railways, bridges, lakes, coastlines, rivers and the like, and peak terrain features such as hill tops, mountains and the like, which can be identified by searching for maximum height data points.

Figure 6E:
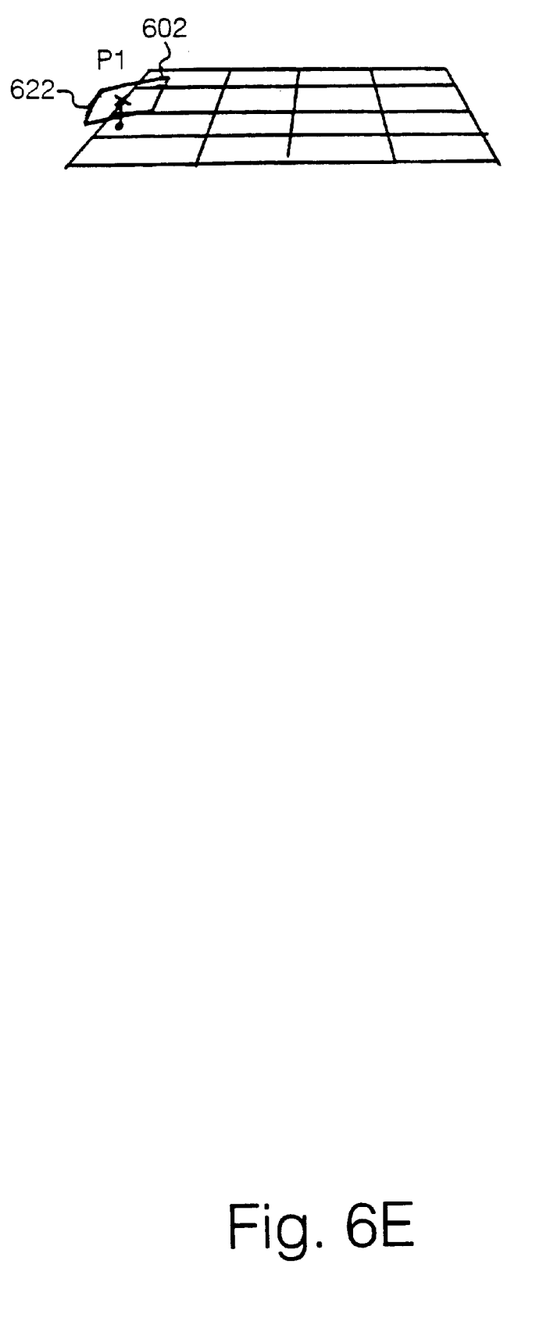
FIG. 6E illustrates schematically in 3-dimesions, an image data taken at a recorded position point of the reconnaissance vehicle, in relation to the mean sea level plane shown in FIG. 6A.

Referring to FIG. 6E herein, there is illustrated schematically an image data, in relation to the two dimensional grid 600 of X, Y coordinates. The two dimensional image data is centered around a position point 602. The image data 622 may cover a square, rectangular, or other shaped area, and is stored electronically. A pictorial print out of the image data, may give raise to a printed image in the form of a reconnaissance photograph, however the image data is stored digitally in the data logger 203 of the aircraft upon collection.

The objective is to match the relatively high resolution image data and altitude data, with the relatively low resolution map data.

Figure 7:
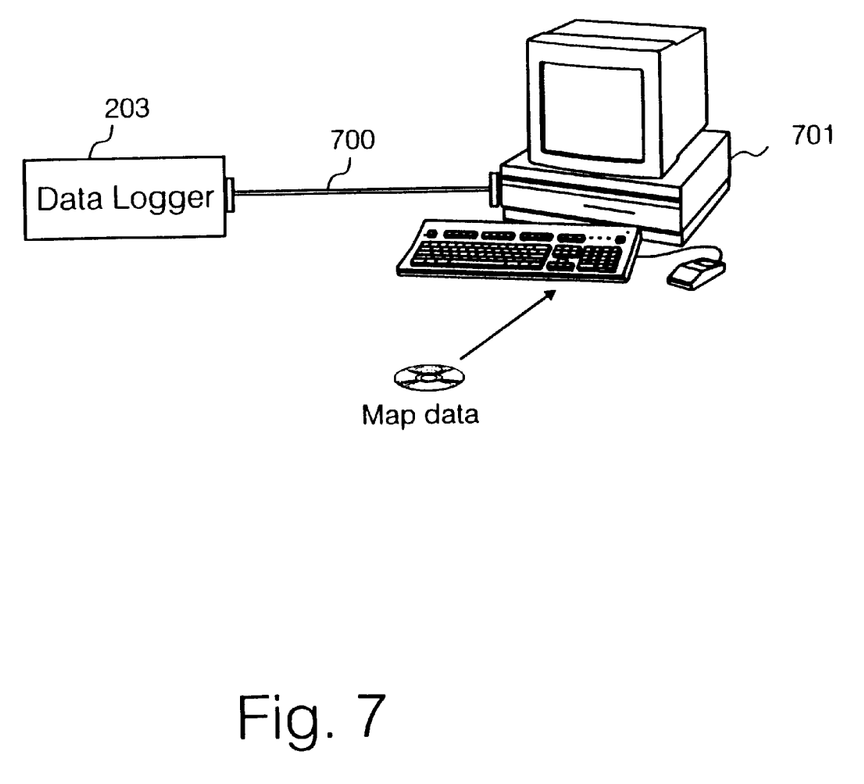
FIG. 7 illustrates schematically data processing apparatus for implementing registration of the digital reconnaissance data collected by the reconnaissance vehicle, with map data.

Referring to FIG. 7 herein, there is illustrated schematically a set of apparatus for downloading the collected image composition and height data from the vehicle, and processing that data, together with map data to obtain a combined resultant map and image data. The apparatus comprises the data logger 203, which can either removed from the vehicle or can remain in situ in the vehicle; a transmission cable 700, for example a local network bus cable as in known in the art, and a conventional computer 701, modified by incorporation of a set of algorithms to perform processing of the map data and image data to match the image data to the map data. Map data may be introduced to the computer 701 on a CD-ROM data storage device 702. The map data stored on CD-ROM 702, may be stored on a hard disk drive, or accessible over a network by the computer 701. It will be appreciated by those skilled in the art, that the data logger 203 may include a tape cassette device, for example a DDS-format device, and computer 701 may be provided with a DDS tape drive, so that data can be transferred via the tape, eliminating the need for the local area network cable 700. Alternatively any other conventional method of transmission of the data from the data logger 203 to the computer can be used.

Figure 8:
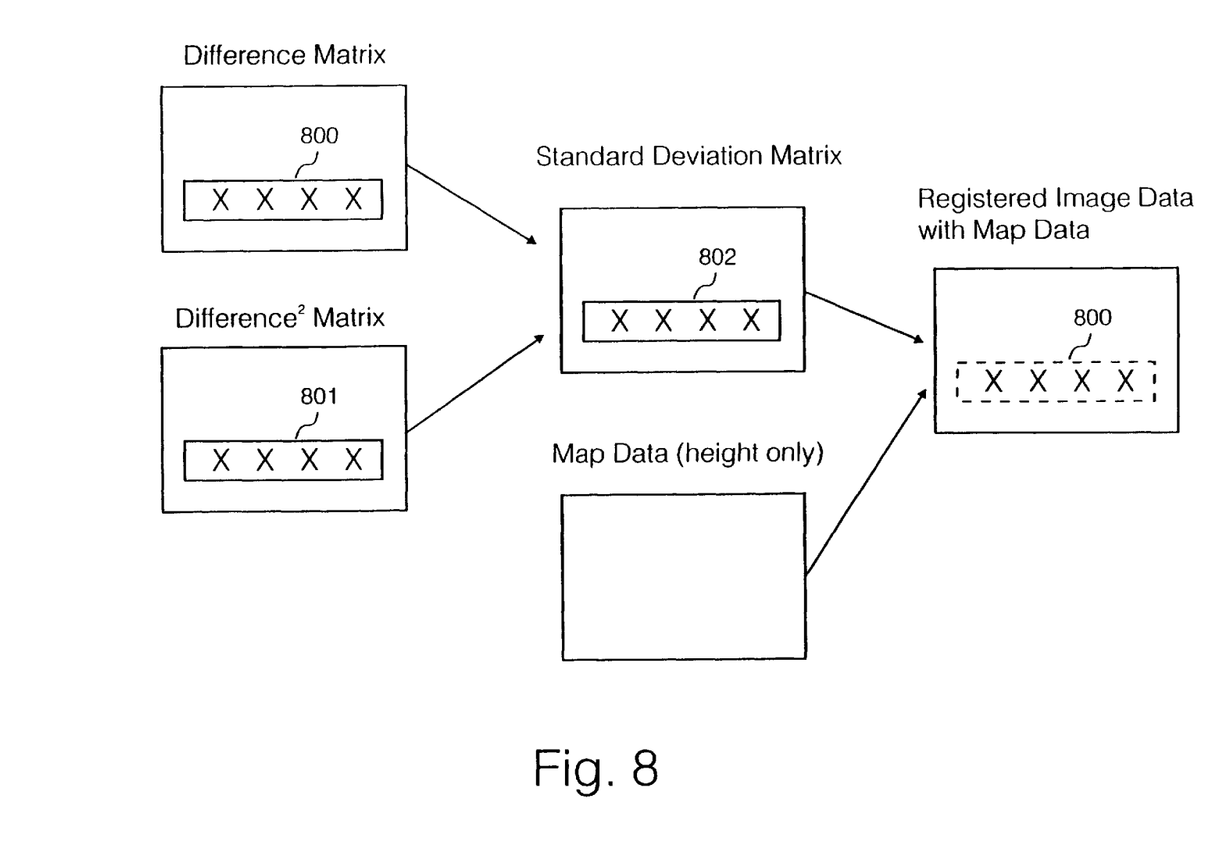
FIG. 8 illustrates schematically overall data processing method for registering recorded image data from the reconnaissance vehicle with digital map data.

Referring to FIG. 8 herein, there is illustrated schematically an overall data processing method for registering the recorded image data from the vehicle, with the map data.

A difference matrix 800 is created, for a plurality of points P1 . . . PN at which altimeter readings have been taken by the vehicle. The difference matrix is calculated by comparing the altitude recorded by the vehicle's altimeter, with the altitude of the vehicle calculated from the vehicle's navigational system, minus the height of the terrain obtained from the map data. Typically, difference data for around 50 individual vehicle positions P1–PN are contained in the difference matrix 800, although the size of the matrix in the general case is not limited.

A difference squared matrix 801 is calculated from the difference matrix 800, being simply the square of the difference, at each position P1 . . . PN.

From the difference matrix 800 and the difference squared matrix 801, a standard deviation matrix 802 is calculated. The standard deviation matrix 802 contains a standard deviation value at each of the positions P1 . . . PN for which an altimeter reading was taken by the vehicle. The standard deviation matrix 802 contains, at each position P1 . . . PN a standard deviation of error between the height above ground level measured directly from the vehicle's altimeter, and the height of the vehicle calculated from the vehicle's navigation system height reading, minus the height above mean sea level. On the one hand, a directly measured height of the vehicle above ground, accurate to within around 1 meter is obtained from the vehicle's altimeter. On the other hand, the height of the vehicle above ground level is calculated with a lower degree of accuracy, by subtracting the height above mean sea level data from the map, from the altitude data measured from the vehicle's navigation system. Theoretically, these two values should be the same at the same vehicle position, however, since there are errors, in the general case these two values will not be the same.

Each value of the standard deviation matrix is examined, and the lowest standard deviation value is selected. This corresponds to a position $P_M$, where there is least error between the two different types of height measurement of the aircraft above ground level. This point is selected for aligning the image data around that position, with the map data around that position. Since the position data in the X, Y plane (latitude, longitude) is accurate only to around 100 meters, the image data can be translated in the X, Y plane, to a position where the first and second height readings measured directly from the altimeter, and calculated from the map data plus navigation data are closest to each other. Therefore a horizontal X, Y translation of the image data with respect to the map data is achieved by comparing that standard deviation of the height data. With a series of images taken at positions P1, P2 . . . PN, an algorithm may align the series of the images, picking first of all the lowest height difference standard deviation position for alignment, then picking the second lowest height standard deviation position, and so on until the sets of image data are aligned with the map data.

Figure 9:
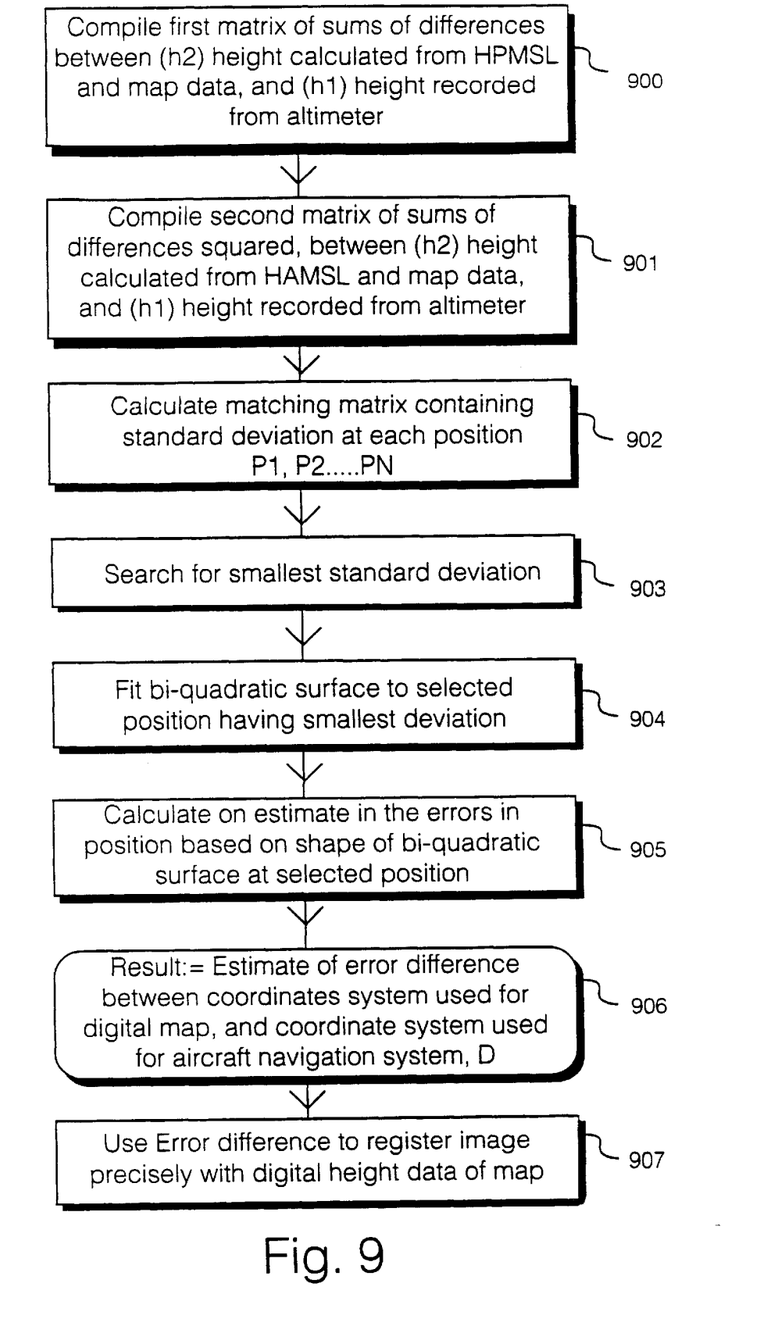
FIG. 9 illustrates schematically process steps carried out by the data processing apparatus for registration of the collected image data with the digital map data.

Referring to FIG. 9 herein, there is illustrated schematically overall process steps carried out by the data processing apparatus for FIG. 7 to perform the data processing illustrated in FIG. 8 herein. In step 900, a first matrix is compiled, of the sums of differences between firstly a height calculated from the height above mean sea level data from the vehicle's navigation system, and additional map data, and secondly the height recorded from the altimeter. In step 901, a second matrix is compiled of sums of differences squared between firstly the height calculated from the height above mean sea level data and the map data, and secondly the height recorded from the altimeter. The first matrix data comprises a difference value at each of a plurality of positions P1 . . . PN at which altimeter data was taken by the vehicle. The second matrix data contains the square of the difference at each position point of the vehicle for which an altimeter reading was recorded.

In step 902, a matching matrix is determined from the first and second matrices, the matching matrix containing a standard deviation value at each of the vehicle positions, P1, P2 . . . PN. In step 903, the standard deviation matrix is searched to find the smallest standard deviation value. This corresponds to the position of the vehicle where the first height of the vehicle read directly from the altimeter (typically to a resolution of around 1 meter) corresponds closest to the second height of the vehicle calculated from the navigation system height, minus the height from the map data.

In step 904 a bi-quadratic surface is generated, using a surface generation algorithm, and is fitted to the selected vehicle position $P_M$ having the smallest standard deviation.

In step 905 there is calculated an estimate in the errors in position PM., based on the shape of the bi-quadratic surface at the selected position, by comparing this with the shape of the terrain surface from the map data. The estimation of errors and fitment of the bi-quadratic surface may be carried out by separate algorithms or sub routines running on the computer of FIG. 7.

In step 906, the result of the error calculation is an estimate of an error difference between the coordinate system used for the digital map, and the coordinates system used for the vehicle navigation system. In step 907, the error difference data is used to translate the two dimensional image data in the X, Y plane precisely to register with the map in the two dimensional plane, by matching up the height data of the map data, with the height data of the bi-quadratic surface, using an algorithm which picks the lowest overall error between the bi-quadratic surface and the height data elements of the map data.

Figure 10:
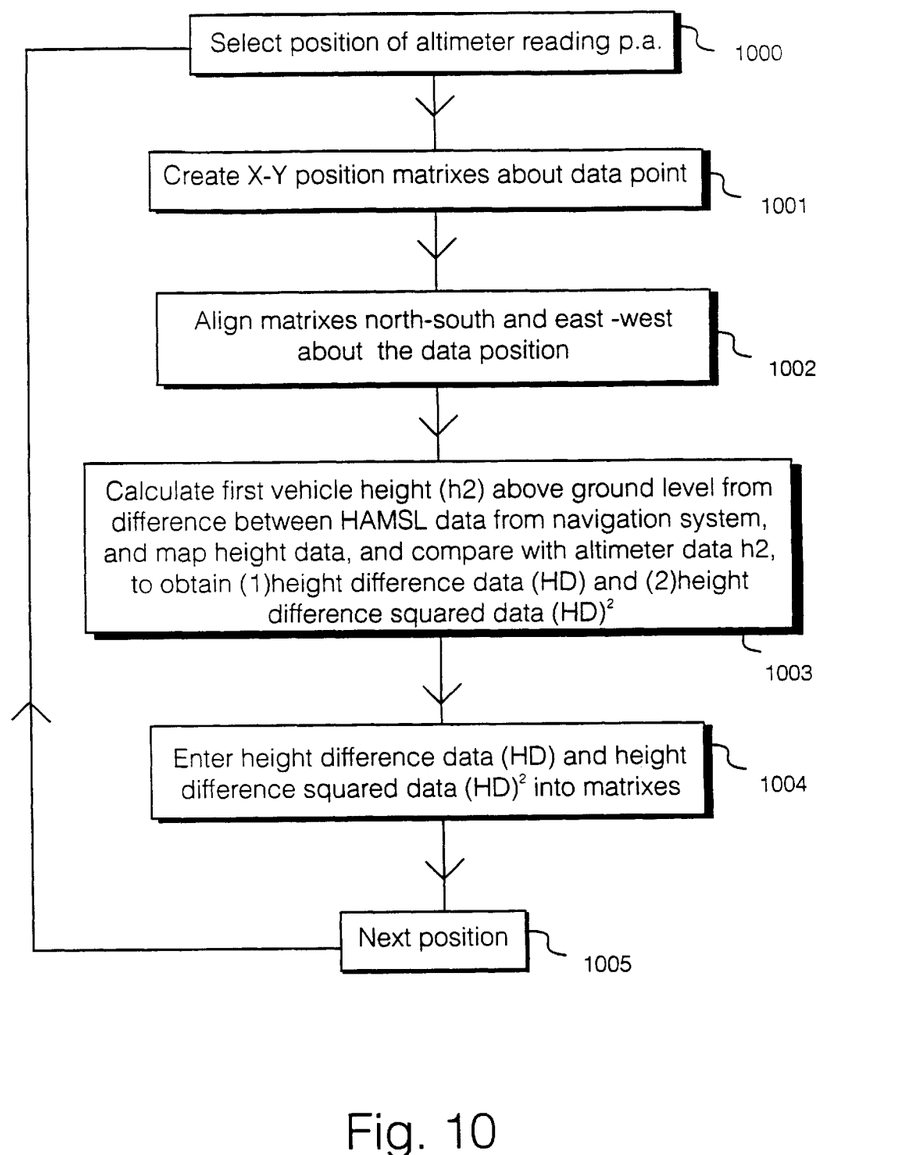
FIG. 10 illustrates schematically process steps carried out for generation of data matrices for differences in height data determined from reconnaissance vehicle and height data determined from map data from a digital map data.

Referring to FIG. 10 herein, there is illustrated schematically data processing steps carried out for generation of the first and second matrixes of steps 900, 901. In step 1000, a vehicle position is selected at which an altimeter reading is available. In step 1001, a matrix of X-Y position data is created about this data point, so that the position $P1_1$ lies at the center of the generated matrix. The matrix extends in X and Y longitude, latitude directions a predetermined distance in each case. This distance can be varied by altering these parameters in an algorithm for generation of the matrix data. In step 1002, the X, Y position matrixes are aligned in a north-south direction and an east-west direction about the vehicle data position P1.

In step 1003, a second vehicle height above ground level is calculated from the difference between the height above mean sea level data obtained from the navigation system of the vehicle, and the height shown in the map data at the same position P1. This is compared with the direct height above ground data obtained from the on board altimeter on the vehicle (first height H1) to obtain a height difference data, and then squared to obtain a height difference squared data. The height data is entered in a first difference matrix 800, and the difference squared data is entered in to the difference squared matrix 801 in step 1004. In step 1005, a next position of the vehicle is selected.

Figure 11:
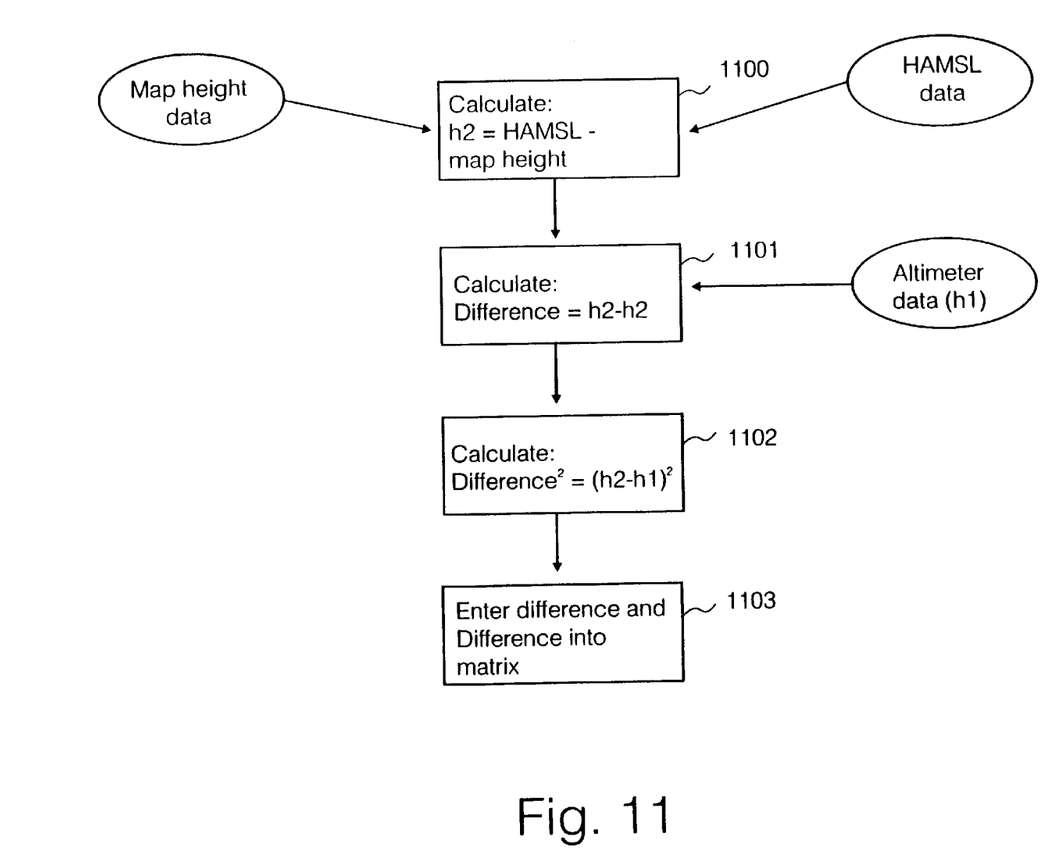
FIG. 11 illustrates schematically for the process steps carried out to obtain the height data matrices.

Referring to FIG. 11 herein, there is illustrated schematically process steps for calculation of the height difference and height difference squared in step 1003. In step 1100, at the position P1, there is calculated the second height difference H2 as the height above mean sea level minus the height data read from the map data. In step 1101 there is calculated the difference between the first height above ground level H1, resulting from step 1100, and the second height H2, being the direct reading of height above ground level from the vehicle's altimeter. In step 1102, there is calculated the difference squared as the height H2 minus the height H1 squared. In step 1103, the first difference data D1 and difference squared data $D^2$ are entered in the appropriate matrices 800, 801.

Figure 12:
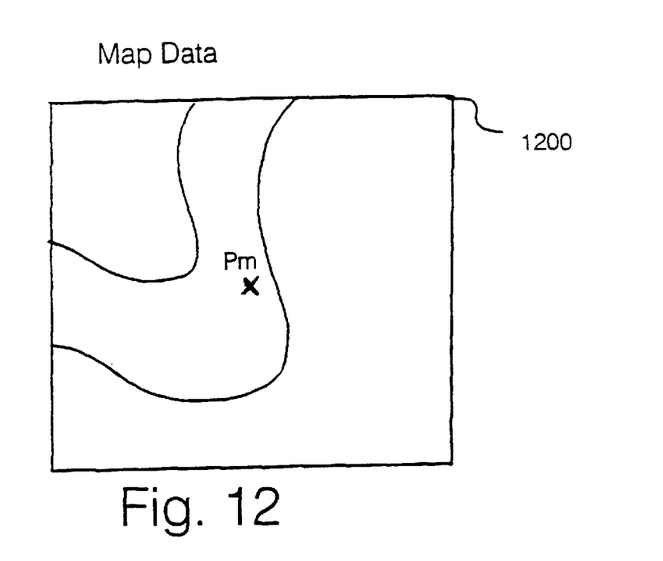
FIG. 12 illustrates schematically in plan view a section of digital map data to be registered a corresponding image data.

Referring to FIG. 12 herein, there is illustrated schematically an example of map data showing height contours around the selected vehicle position $P_M$ which has the lowest standard deviation found in step 903.

Figure 13:
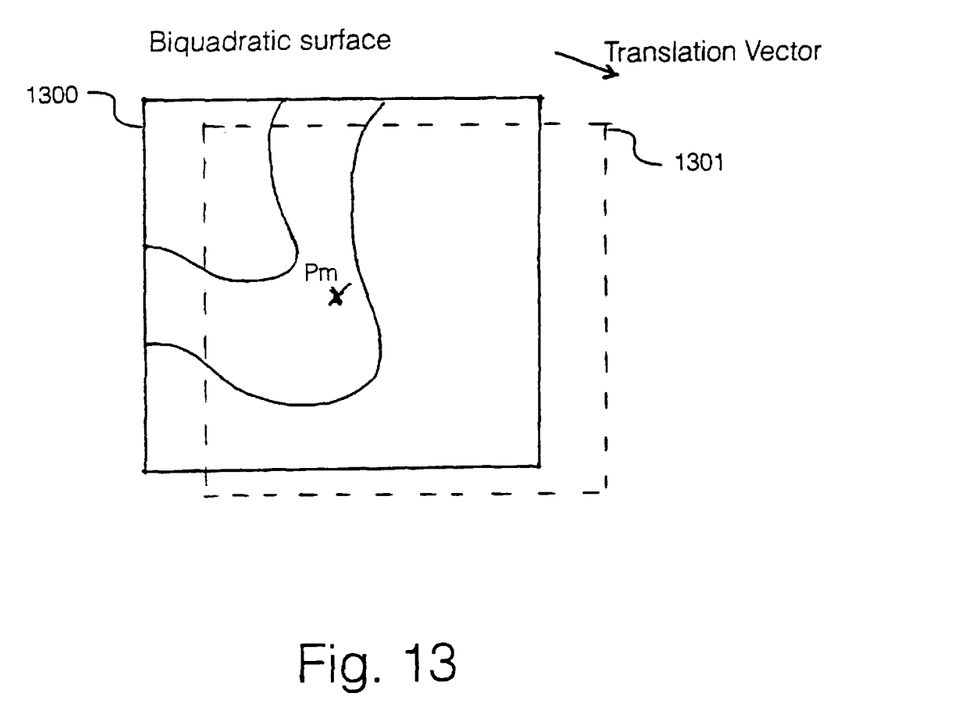
FIG. 13 illustrates schematically registration of a bi-quadratic data generated around a position point data, with the map data of FIG. 12.

Referring to FIG. 13 herein, there is illustrated schematically a height contour data of a bi-quadratic surface generated in step 904 around the position $P_M$ at which the lowest standard deviation between directly measured height from the vehicle altimeter, and calculated height from the navigation data and map data information was determined. The bi-quadratic surface height data is compared with the height contour data on the map data of FIG. 12, and errors between the bi-quadratic surface height data and the map data height data are minimised, so that the bi-quadratic surface is registered in the X, Y latitude longitude direction with the map data. A translation required to the bi-quadratic surface is represented by an arrow in FIG. 13 in order to register the bi-quadratic surface with the map data as illustrated by the translated surface 1301. The result of the comparison between the bi-quadratic surface and the map data is a translation vector, which can be applied to the image data about the position $P_M$ in order to register the image accurately with the map data.

The above described specific implementation does not rely on the absolute accuracy of either the map height or the height data recorded from the navigation system of the vehicle, but only on the relative accuracy between each altitude measurement point recorded by the altimeter.

What is claimed is:

1. A method of matching reconnaissance image data with map data, said method comprising the steps:

recording a frame of said image data at each of a plurality of positions;

recording a position data at each of said positions;

recording an altitude above ground level data at each of said positions;

recording a height above mean sea level data at each of said positions;

for each said position, determining a first height above ground as a difference between said mean sea level, and a height data at said position read from said map data;

for each said position comparing said first height data with said altitude data to obtain a corresponding respective standard deviation of difference between said first and second heights;

selecting a position having a lowest standard deviation of a plurality of said standard deviations, and matching said image position to a corresponding position on said map for said position with said lowest standard deviation;

generating a surface data at said selected position;

comparing a height of said generated surface data with said map height data at said position, and obtaining a height error data between said generated surface height and said map height data; and translating said image data until said error data is optimised.

2. The method as claimed in claim 1, wherein said step of translating said image data comprises translating said image data until a minimum overall error between said surface height data and said map height data is found.

3. The method as claimed in claim 1 or 2, wherein said step of obtaining a standard deviation of difference between said first and second height and said altitude data comprises:

for each said position, determining a difference between said first height data and said altitude data; and;

determining a difference squared between said first height data and said is altitude data.

4. The method as claimed in claim 1, further comprising the step of:

recording roll and pitch data at said position;

using said roll and pitch data to determine a point of said image data which coincides with said position data.

5. The method as claimed in claim 1, wherein said step of generating a surface data at said position comprises:

generating a bi-quadratic surface data around said position.

6. A method for providing composite digital and terrain image map data, said method comprising the steps of:

(a) taking and recording a sequential series of terrain images from an airborne or above atmosphere vehicle having an internal navigation system, and an altimeter for taking and recording a sequential series of terrain images, navigation positions and altimeter readings;

(b) establishing and recording for each image the height of the vehicle above the terrain as indicated by the altimeter and the position, roll and pitch of the vehicle above the terrain as indicated by the navigation system;

(c) comparing the digital map terrain elevation data with the vehicle height data along the series of recorded terrain images;

(d) establishing and orientating matrices about selected data points along the series of recorded terrain images where the difference between the digital map terrain elevation data and vehicle height data is within a desired limit;

(e) calculating the differences and differences squared between the vehicle height above sea level and the digital map terrain elevation at each selected data point;

(f) repeating steps (a) to (e) for a further sequential series of terrain images;

(g) calculating a matching matrix from the data of step (e) for both series of terrain images to establish a standard deviation at each data point;

(h) identifying the smallest standard deviation which, when the vehicle position from the vehicle internal navigation system is correct, provides the centre point or centre point of the matching matrix; and (i) estimating from the centre point, the difference between the digital map data and the vehicle navigation system data when the terrain images were taken from, from which the digital map and terrain images can be registered one with the other, to provide composite map data.

7. A method of registering reconnaissance image data with map data comprising the steps of:
- recording image data from a plurality of positions, together with the roll, pitch and height above mean sea level data from an airborne navigation system and imaging system at those positions;
- recording an altitude data of said positions, using an altimeter;
- obtaining a difference between said recorded altitude data, and an altitude calculated from said navigation system data and a map data;
- selecting a difference data having a lowest standard deviation, and at a position of said selected difference data generating a three dimensional surface data;
- generating a three dimensional surface data of each of said plurality of positions for which said image data is recorded;
- generating a difference data between said three dimensional surface data, and height data obtained from said map, and minimising an error between said three dimensional surface data and said height data by translating said position data relative to said map data, until minimum error is achieved;
- registering said image data with said map data after applying said translation of said image data.

8. A method of matching a set of a plurality of reconnaissance image data frames collected by a reconnaissance vehicle traversing over a terrain, with a map data, said method comprising the steps of:
- recording said plurality of reconnaissance image data frames using an imaging system on board said reconnaissance vehicle, as said vehicle flies over said terrain;
- for each said reconnaissance image data recorded, recording a vehicle latitude, longitude position data using a navigation system on board said vehicle;
- for each said longitude, latitude position data, recording a height above mean sea level data using said on board navigation system;
- for each said position data, recording a height of said vehicle above said terrain, using an on board vehicle height measurement system;
- matching each of said reconnaissance vehicle latitude, longitude positions, with corresponding X, Y positions of said map data; and
- matching said image data with said map data.

9. The method as claimed in claim 8, wherein said step of matching said vehicle positions with said map data comprises:
- (i) comparing digital map terrain elevation data with vehicle height data along the set of recorded reconnaissance image data frames;
- (ii) establishing and orientating matrices about selected data points along the series of recorded reconnaissance image data frames where the difference between the digital map terrain elevation data and vehicle height data is within a predetermined limit;
- (iii) calculating differences and differences squared between the vehicle height above sea level and said digital map terrain elevation at each said vehicle position data;
- (iv) repeating steps (i) to (iii) for all data frames in said set of data frames;
- (v) calculating a matching matrix from the data of step (iv) for both series of reconnaissance image data frames to establish a standard deviation at each vehicle position data;
- (vi) identifying a smallest standard deviation which, when the vehicle position data from the vehicle navigation system is correct, provides a centre point of the matching matrix; and
- (vii) estimating from said centre point, a difference between the map data and the vehicle position data where the reconnaissance image data frames were taken from, from which the digital map and reconnaissance image data can be registered one with the other, to provide composite map data in which said reconnaissance image data is registered with said map data.

* * * * *